United States Patent [19]
Filter

[11] 3,837,077
[45] Sept. 24, 1974

[54] SHEARS FOR CUTTING A FILLING THREAD IN A WEAVING MACHINE
[75] Inventor: Claus Filter, Rethem, Aller, Germany
[73] Assignees: Vereinigte Osterreichische Fisenund Stahlwerke-Alpine Montan Aktiengesellschaft, Vienna, Austria; Establissement Wanderfield, Schaan, Liechtenstein
[22] Filed: Sept. 7, 1973
[21] Appl. No.: 395,299

[30] Foreign Application Priority Data
Sept. 18, 1972 Austria ................................ 7969/72

[52] U.S. Cl. .................................... 30/231, 30/241
[51] Int. Cl. ............................................ B26d 1/02
[58] Field of Search ............ 30/194, 208, 226, 227, 30/228, 241, 242, 243, 231, 196, 197, 209, 210, 215

[56] References Cited
UNITED STATES PATENTS
304,293 9/1884 Case ..................................... 30/226
1,759,842 5/1930 Fossa ..................................... 30/241
2,261,679 11/1941 Geier ..................................... 30/231
2,521,509 9/1950 Fine ..................................... 30/208 X FOREIGN PATENTS OR APPLICATIONS
1,333,886 6/1963 France ............................... 30/241

Primary Examiner—Al Lawrence Smith
Assistant Examiner—J. C. Peters
Attorney, Agent, or Firm—Kurt Kelman

[57] ABSTRACT

A stationary carrier is formed with a mouth defined by two spaced apart stationary cutting edges. The carrier has a sleevelike portion. A circular cylindrical rod has an angled end portion which constitutes a shear blade extending between said stationary cutting edges and having two cutting edges which are disposed on opposite sides of said blade and face respective ones of said stationary cutting edges. The rod is formed with a flat and extends in and is guided by said sleevelike portion and is reciprocable to cause said cutting edges of said blade to cooperate with said stationary cutting edges. A stationary leaf spring bears on said flat and tends to hold said rod in such an angular position that said blade crosses said stationary cutting edges.

2 Claims, 3 Drawing Figures

PATENTED SEP 24 1974  3,837,077
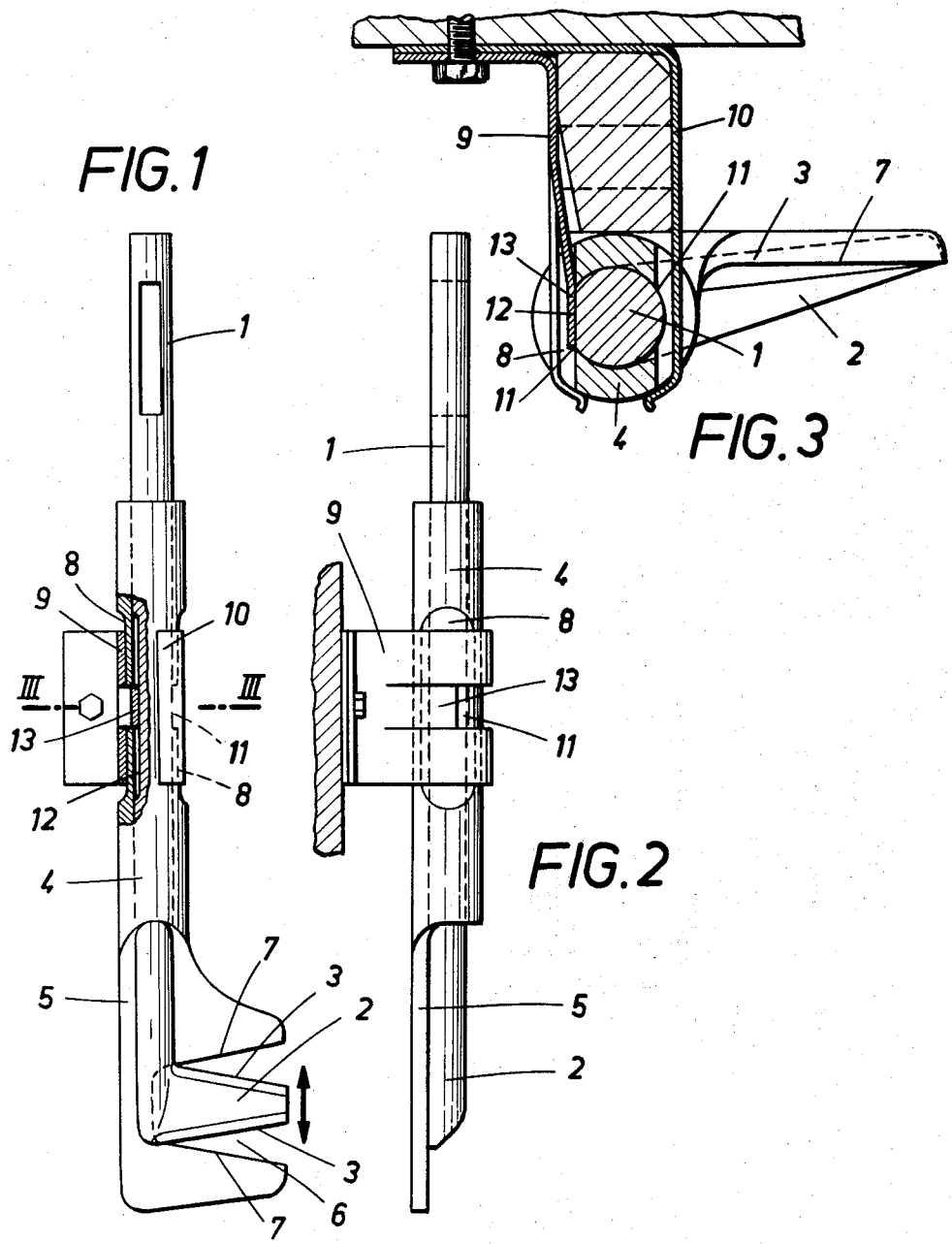

SHEARS FOR CUTTING A FILLING THREAD IN A WEAVING MACHINE

This invention relates to shears for cutting the filling thread in weaving machines, comprising a double-edged shear blade which is reciprocable between and adapted to cooperate with two stationary cutting edges which define a mouth.

In the conventional shears for filling threads, the movable shear blade and the cooperating shearing blade, which is in most cases stationary, have only one cutting edge each. For this reason the shears must be opened after each cut in order to be ready for the next cut. As a result, the movable shear blade must perform twice the number of strokes so that the wear of the cutting edges is increased as well as the energy consumption.

selvage-cutting devices have been disclosed in which a double-edged movable shear blade reciprocates between two or more stationary cutting edges so that each of the upward and downward movements of the blade results in a cut.

To ensure that the filling thread is not clamped between but is sharply cut by the cooperating shear blades, the pressure force by which the movable shear blade is forced against the cutting edges which cooperate with the movable blade must be sufficient for a good cut. In the known cutting devices this is accomplished in most cases in that the cooperating shear blades are subjected to a suitable initial stress. When this initial stress decreases after a prolonged time of operation of the shears, the latter can no longer be used and must be renewed.

A desirable spatial arrangement is provided for in a known cutting device in which the shear blades are formed on a circular cylindrical reciprocating rod, which is slidably mounted in a cylindrical guide. This cylindrical guide has apertures which are defined by the stationary cutting edges of the cutting device so that cuts can be performed when the rod is reciprocated. This known device has the disadvantage that the cooperating cutting edges cannot be forced against each other so that the filling thread will be clamped or pinched between the cooperating cutting edges when the device has been used for a relatively short time.

It is an object of the invention to eliminate these disadvantages and to provide shears which serve to cut the filling thread without need for idle strokes and which always ensure a uniformly satisfactory cut because simple means are provided which force the movable shear blade with a sufficiently strong pressure force against the blades which cooperate with the movable blade.

In shears of the kind first hereinbefore, this object is accomplished by the invention in that the shear blade is formed by an angled end portion of a circular cylindrical reciprocating rod, known per se, that said rod, as is also known per se, is guided in a sleevelike portion of the carrier for the cutting edges cooperating with the shear blade, and that the reciprocating rod has a flat which is parallel to the axis of the rod and engaged bu a stationary leaf spring, which tends to hold the reciprocating rod in an angular position in which the shear blade and the cutting edges cooperating therewith cross each other. When the movable shear blade is in a position midway between the two stationary cutting edges, the leaf spring applying pressure to the flat holds the reciprocating rod in an angular position in which the shear blade and the cutting edges cooperating therewith cross each other. During a displacement of the reciprocating rod, the shear blade must be rotated against the force of the leaf spring as the shear blade slides along the respective cutting edge then cooperating with the shear blade so that the required pressure force is always exerted in the area where the cut is performed. Without a rotation of the shear blade about the axis of the reciprocating rod, i.e., if the shear blade were moved parallel to itself, the cutting conditions would vary as the shear blade moves along the cutting edge with which the shear blade cooperates. This is due to the fact that the contact pressures vary because the blades are not perfectly planar and are formed with indentations and for other reasons. The means provided according to the invention for mounting the movable shear blade are relatively simple in structure and yet ensure that the pressure force by which the movable shear blade is forced against the cutting edges cooperating with the movable shear blade is sufficient for a satisfactory cut.

A desirable arrangement will be obtained in accordance with the invention if the sleevelike portion of the carrier has two mutually opposite recesses, which have parallel axes and are adapted to receive a resilient U-shaped holder, at least one of these recesses is formed with a window, through which the flat of the reciprocating rod is exposed, and the leaf spring consists of a tongue formed on one leg of the holder so that the shears can simply be inserted into the holder and there is no need for a separate leaf spring.

An embodiment of the invention is shown by way of example on the accompanying drawing, in which FIG. 1 is an elevation showing shears for cutting a filling thread, FIG. 2 is a side elevation showing on a larger scale the shears of FIG. 1, and FIG. 3 is a still further enlarged sectional view taken on line III—III in FIG. 1.

The angled lower end portion of a reciprocating rod 1 constitutes a shear blade 2 having two cutting edges 3. The reciprocating rod is slidable in and guided by a sleevelike portion 4 of a carrier 5, which forms a mouth 6 that is defined by cutting edges 7, which cooperate with the shear blade 2. The reciprocating rod 1 is moved up and down. During its upward movement, the upper cutting edge 3 of the shear blade 2 cooperates with the upper stationary cutting edge 7. During the downward movement of the rod 1, the lower cutting edge 3 cooperates with the lower stationary cutting edge 7. The mouth 6 is free to receive the filling thread after each cut. The shear blade 2 is shown in an intermediate position in FIGS. 1 and 2.

The sleevelike portion 4 of the carrier 5 has two mutually opposite recesses 8, which have parallel axes and receive the two legs 9, 10 of a resilient U-shaped holder. Windows 11 are formed in the recesses 8. Adjacent to one of these windows the reciprocating rod 1 has a flat 12, which is parallel to the axis of the rod and is engaged by a leaf spring formed by a tongue 13 strick out from the holder leg 9. When the shear blade 2 is in a position midway between the cutting edges 7, as shown, the spring tongue 13 applying pressure to the flat 12 holds the reciprocating rod in such an angular position that the shear blade 2 and the cutting edges 7 cross each other, as is shown in FIG. 3. When the reciprocating rod 1 is displaced in one direction or the other, the contact pressure between the shear blade and the cutting edge cooperating therewith causes the reciprocating rod to be turned back against the force of the resilient tongue 13.

What is claimed is:

1. Shears for cutting a filling thread in a weaving machine, which shears comprise a stationary carrier formed with a mouth defined by two spaced apart stationary cutting edges, said carrier having a sleevelike portion, a circular cylindrical rod, which has an angled end portion which constitutes a shear blade extending between said stationary cutting edges and having two cutting edges which are disposed on opposite sides of said blade and face respective ones of said stationary cutting edges, said rod being formed with a flat and extending in and being guided by said sleevelike portion and being reciprocable to cause said cutting edges of said blade to cooperate with said stationary cutting edges, and a stationary leaf spring which bears on said flat and tends to hold said rod in such an angular position that said blade crosses said stationary cutting edges.

2. Shears as set forth in claim 1, in which said sleevelike portion has two recesses which are disposed on opposite sides of said sleevelike portion and extend parallel to the axis thereof, at least one of said recesses being formed with a window, said flat being exposed through said window in all positions which the rod is adapted to assume during its reciprocation, a resilient holder is provided, which is U-shaped and has two legs engaging said sleevelike portion in respective ones of said recesses, and said leaf spring consists of a tongue which is struck out of one of said legs.

* * * * *